United States Patent [19]

Burns

[11] Patent Number: 5,649,082

[45] Date of Patent: Jul. 15, 1997

[54] EFFICIENT METHOD AND APPARATUS FOR DETERMINING TEXTURE COORDINATES FOR LINES AND POLYGONS

[75] Inventor: Derrick R. Burns, San Mateo, Calif.

[73] Assignee: Silicon Graphics, Inc., Mountain View, Calif.

[21] Appl. No.: 408,928

[22] Filed: Mar. 20, 1995

[51] Int. Cl.$^6$ ............................................. G06F 15/00
[52] U.S. Cl. ............................................. 395/130
[58] Field of Search ............................ 395/130, 142, 395/162, 164; 345/148, 149

[56] References Cited

U.S. PATENT DOCUMENTS

| | | | |
|---|---|---|---|
| 5,276,798 | 1/1994 | Peaslee et al. | 395/162 |
| 5,307,450 | 4/1994 | Grossman | 395/123 |
| 5,379,370 | 1/1995 | Allain et al. | 395/122 |

*Primary Examiner*—Phu K. Nguyen
*Attorney, Agent, or Firm*—Blakely, Sokoloff, Taylor & Zafman

[57] ABSTRACT

A method of generating a pixel in a computer system. The computer system includes a processor and a memory. The memory includes a first polygon and a texture map. The method comprises the steps of: accessing a first point on a first polygon. A step of determining a first line segment having less than a predetermined error and determining whether a next line segment causes less than the predetermined error. The next line segment is longer than the first line segment in one direction. If the next line segment causes less than the predetermined error, then determine whether a new next line segment causes less than the predetermined error. Otherwise, access a texel in the texture map at a position corresponding to the first point and the first line segment, and generate the pixel from the texel.

14 Claims, 6 Drawing Sheets

EFFICIENT METHOD AND APPARATUS FOR DETERMINING TEXTURE COORDINATES FOR LINES AND POLYGONS

NOTICE

©1995 Silicon Graphics Incorporated. A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

BACKGROUND OF THE INVENTION

1. Field of Invention

The present invention relates to the field of graphics rendering and display. In particular, the present invention describes an efficient method and apparatus for determining texture coordinates for lines and polygons.

2. Description of Related Art

Computer systems display graphical images through a process of rendering a computer model. The graphical images are typically made from tens of thousands of pixels (picture elements). The computer model can be represented within the computer system as a number of polygons and a texture map. A texture map represents a texture that is to be wrapped around a 3-D model. Computer systems render the computer model by generating pixels from the polygons and the texture map.

For example, assume a programmer wishes to display a can of soda pop in a computer system. The programmer can enter a 3-D model of a cylinder and a texture of a soda pop label. The computer system can then display an image of a soda pop can by mapping the texture onto the 3-D model through the rendering process.

Rendering images requires large amounts of computer power. A typical image can include thousands of polygons and hundreds of texture maps. To determine each pixel value, the speed of the mapping of the texture to the polygons can greatly affect the speed of the rendering of the image. It is desirable to increase the speed of the rendering process because larger, more detailed, images can be displayed.

One improvement to the speed of the rendering process has been to develop specialized hardware. The hardware can render numerous pixels at a time. However, this specialized hardware is expensive and does not help the large installed base of computer systems that do not have this specialized hardware.

Therefore it is desirable to improve the efficiency of the rendering process, and specifically the mapping process, by developing a more efficient method and apparatus for performing the mapping process.

SUMMARY OF THE INVENTION

An efficient method and apparatus for determining texture coordinates for lines and polygons is described.

A method of generating a pixel in a computer system. The computer system includes a processor and a memory. The memory includes a first polygon and a texture map. The method comprises the steps of: accessing a first point on a first polygon. A step of determining a first line segment having less than a predetermined error and determining whether a next line segment causes less than the predetermined error. The next line segment is longer than the first line segment in one direction. If the next line segment causes less than the predetermined error, then determine whether a new next line segment causes less than the predetermined error. Otherwise, access a texel in the texture map at a position corresponding to the first point and the first line segment, and generate the pixel from the texel.

Although a great deal of detail has been included in the description and figures, the invention is defined by the scope of the claims. Only limitations found in those claims apply to the invention.

BRIEF DESCRIPTION OF THE DRAWINGS

The present invention is illustrated by way of example, and not limitation, in the figures. Like references indicate similar elements.

DESCRIPTION OF THE PREFERRED EMBODIMENT

OVERVIEW.

An efficient method and apparatus for determining texture coordinates for lines and polygons is described. In the following description, numerous specific details are set forth such as the order of the steps performed in rendering an image, etc., in order to provide a thorough understanding of the present invention. In other instances, well-known circuits, structures and techniques have not been shown in detail in order not to unnecessarily obscure the present invention.

Overview of One Embodiment of the Present Invention

One embodiment of the present invention includes a more efficient method of performing the texture mapping process. The texture mapping process requires a look-up in the texture map for each pixel in the image that corresponds to a particular portion of a computer model. For very accurate results, each look-ups typically requires a number of computationally expensive operations (such as a division operation). Based upon a specialized piecewise linear approximation, one embodiment of the present invention reduces the number of computational expensive operations needed in performing a look-up in a texture.

Further, one embodiment of the present invention performs approximated lookup without exceeding a maximum allowable error. This provides an acceptable image quality with a significant execution speed increase.

Note that throughout the following description, the mapping process will be described as if the texels (texture map elements) located in the texture map are the final pixels. However, in other embodiments, located texels are stored and then compositted with other values before the final image is completed.

A Computer System

Figure 1:
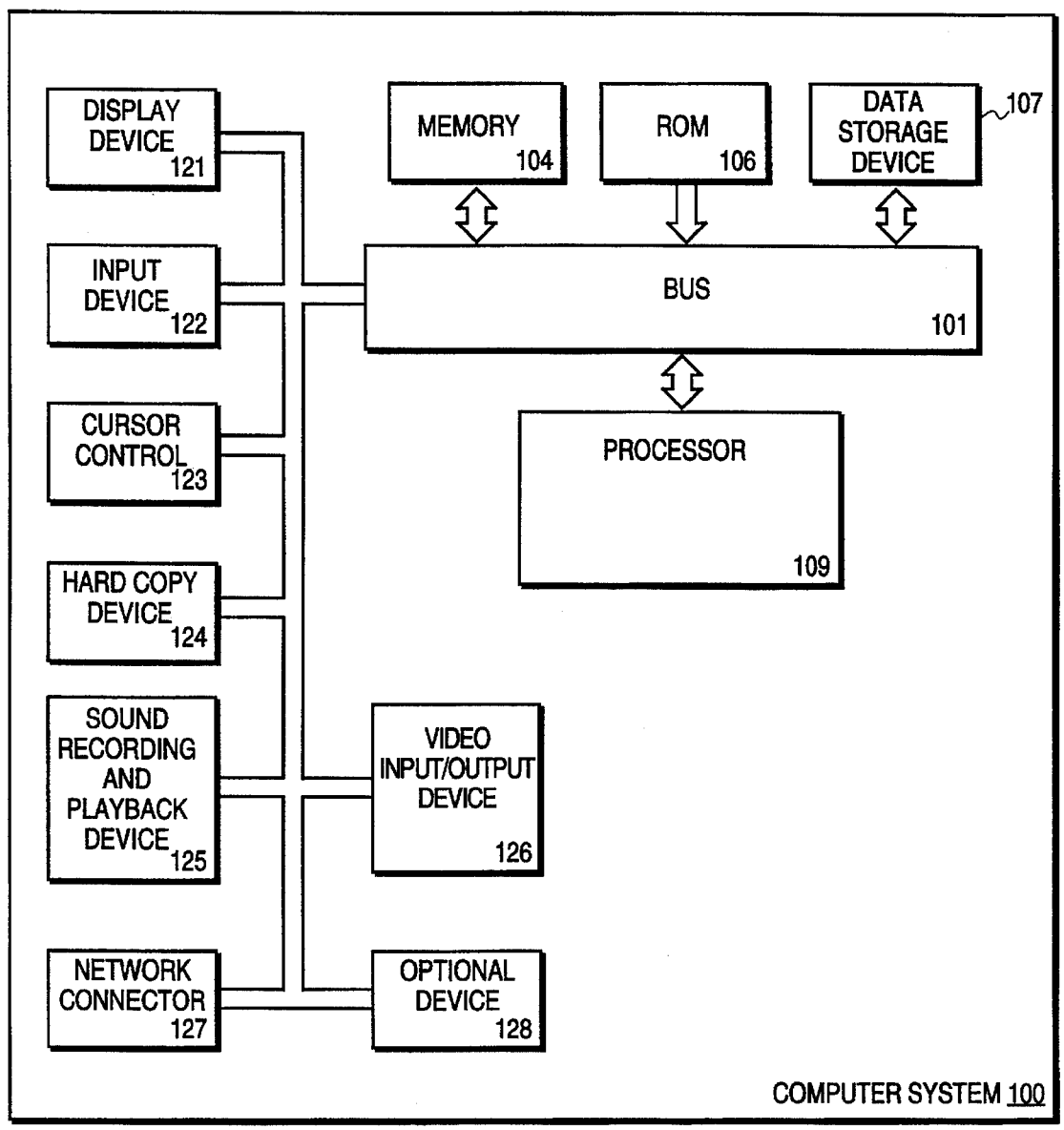
FIG. 1 illustrates a computer system upon which one embodiment of the present invention can be implemented.

FIG. 1 illustrates a computer system 100 upon which an embodiment of the invention can be implemented. The computer system 100 includes a bus 101, or other communications hardware and software, for communicating information, and a processor 109, coupled with the bus 101, is for processing information. The processor 109 can be a single processor or a number of individual processors that can work together. The computer system 100 further includes a memory 104. The memory 104 can be random access memory (RAM), or some other dynamic storage device. The memory 104 is coupled to the bus 101 and is for storing information and instructions to be executed by the processor 109. The memory 104 also may be used for storing temporary variables or other intermediate information during the execution of instructions by the processor 109. The computer system 100 also includes a ROM 106 (read only memory), and/or some other static storage device, coupled to the bus 101. The ROM 106 is for storing static information such as instructions or data.

The computer system 100 can optionally include a data storage device 107, such as a magnetic disk, a digital tape system, or an optical disk and a corresponding disk drive. The data storage device 107 can be coupled to the bus 101.

The computer system 100 can also include a display device 121 for displaying information to a user. The display device 121 can be coupled to the bus 101. The display device 121 can include a frame buffer, specialized graphics rendering devices, a cathode ray tube (CRT), and/or a flat panel display. The bus 101 can include a separate bus for use by the display device 121 alone.

An input device 122, including alphanumeric and other keys, is typically coupled to the bus 101 for communicating information, such as command selections, to the processor 109 from a user. Another type of user input device is a cursor control 123, such as a mouse, a trackball, a pen, a touch screen, a touch pad, a digital tablet, or cursor direction keys, for communicating direction information to the processor 109, and for controlling the cursor's movement on the display device 121. The cursor control 123 typically has two degrees of freedom, a first axis (e.g., x) and a second axis (e.g., y), which allows the cursor control 123 to specify positions in a plane. However, the computer system 100 is not limited to input devices with only two degrees of freedom.

Another device which may be optionally coupled to the bus 101 is a hard copy device 124 which may be used for printing instructions, data, or other information, on a medium such as paper, film, slides, or other types of media.

A sound recording and/or playback device 125 can optionally be coupled to the bus 101. For example, the sound recording and/or playback device 125 can include an audio digitizer coupled to a microphone for recording sounds. Further, the sound recording and/or playback device 125 may include speakers which are coupled to digital to analog (D/A) converter and an amplifier for playing back sounds.

A video input/output device 126 can optionally be coupled to the bus 101. The video input/output device 126 can be used to digitize video images from, for example, a television signal, a video cassette recorder, and/or a video camera. The video input/output device 126 can include a scanner for scanning printed images. The video input/output device 126 can generate a video signal for, for example, display by a television.

Also, the computer system 100 can be part of a computer network (for example, a LAN) using an optional network connector 127, being coupled to the bus 101. In one embodiment of the invention, an entire network can then also be considered to be part of the computer system 100.

An optional device 128 can optionally be coupled to the bus 101. The optional device 128 can include, for example, a PCMCIA card and a PCMCIA adapter. The optional device 128 can further include an optional device such as modem or a wireless network connection.

AN EXAMPLE OF TEXTURE MAPPING

Figure 2:
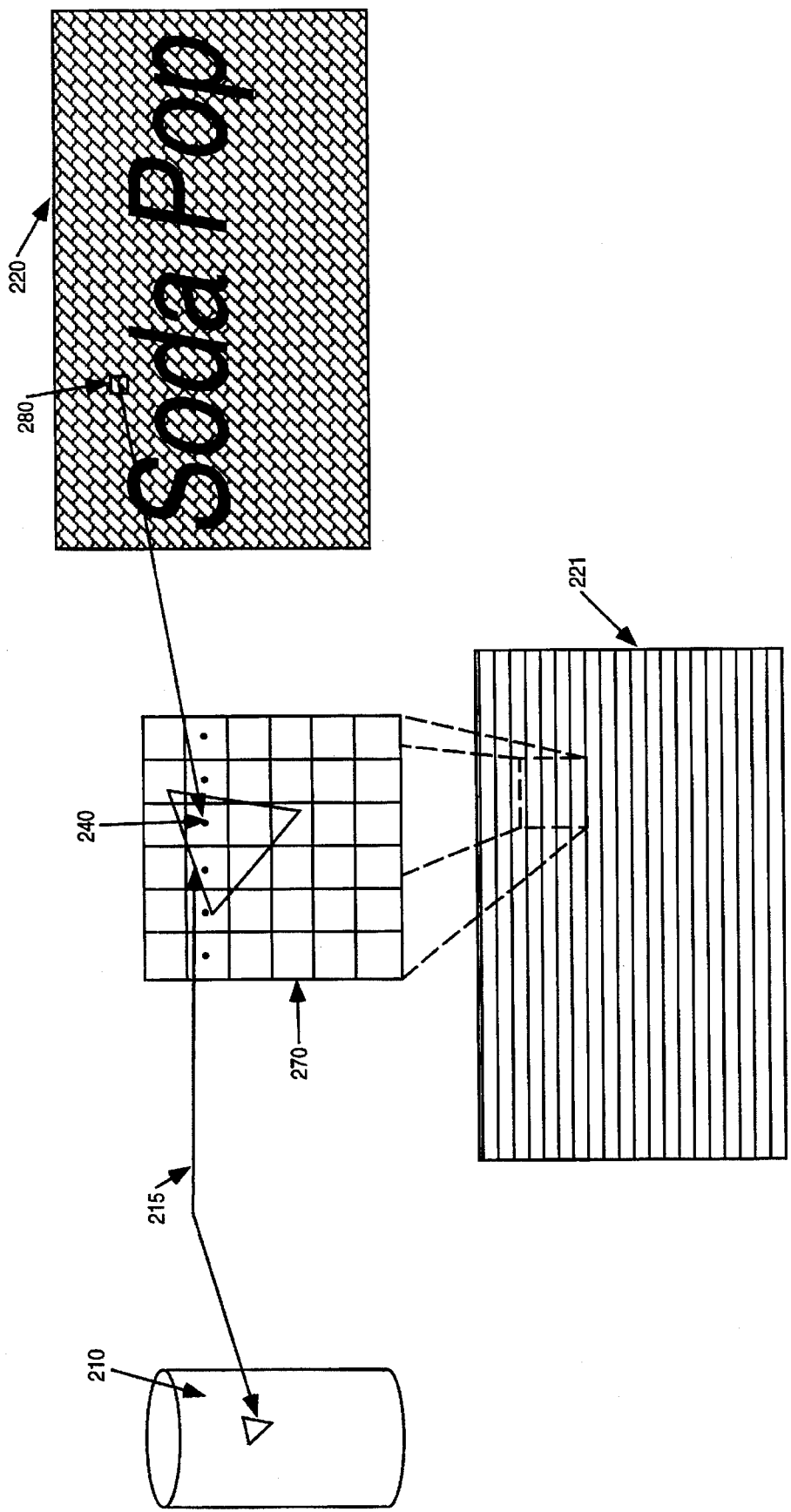
FIG. 2 illustrates mapping a texture onto a model and displaying the result on a display.

FIG. 2 illustrates mapping a texture onto a model and displaying the result on a display. In this example, an image of a soda pop is rendered. A computer model of a cylinder is combined with a texture of a soda pop label to create the image. The computer system of FIG. 1 can be used to implement this example.

The example of FIG. 2 includes a number of components: an object to be rendered 210; a texture map 220; a portion of the texture map 280; an example display 221; and an enlarged portion of the example display 270.

The object to be rendered 210 is an example of a computer model of a 3-D object that is to be displayed. The object to be rendered 210 is typically represented as a number of polygons (often triangles). Polygon 215 represents such a polygon. Main memory 104 can store such an object to be rendered 210.

Texture map 220 includes a number of texels (texture map elements). The texture map 220 includes a portion of the texture map 280. The portion of the texture map 280 can be a single texel, or a number of texels that can be interpolated to generate a resulting texel.

An example display 221 includes a number of scanlines. The example display 221 displays the rendered image of the soda pop can. The user of the computer system 100 can view the rendered image on the example display 221. Example display 221 includes a number of pixels. Enlarged portion of the example display 270 includes a number of pixels that include the rendered image of polygon 215. Pixel center 240 identifies a pixel in the rendered image of polygon 215.

To map the texture map 220 onto the object to be rendered 210, a relationship between the object to be rendered 210, the view of the object to be displayed in the image (such as a top view, a profile view, etc.), and the texture map is determined. The relationship is then used to determine a location in the texture map 220 corresponding to each pixel that is to be displayed. For example, a pixel center 240 can be determined by performing a look-up in texture map 220. In this example, the pixel center 240 corresponds to the portion of the texture map 280.

Note, for each pixel in polygon 215, at least one look-up into the texture map 220 must be performed. Remember that typical images use thousands of polygons and require hundreds of thousands of accesses to the texture map. For a good quality display, the image should be created 72 times per second. Thus, processor 109 must perform the same set of operations hundreds of thousands of times per second. Reducing the number, and the complexity, of the operations performed by processor 109 can have a significant effect on the performance of the image display.

A Relationship Between a Texture Map and a Model

Figure 3:
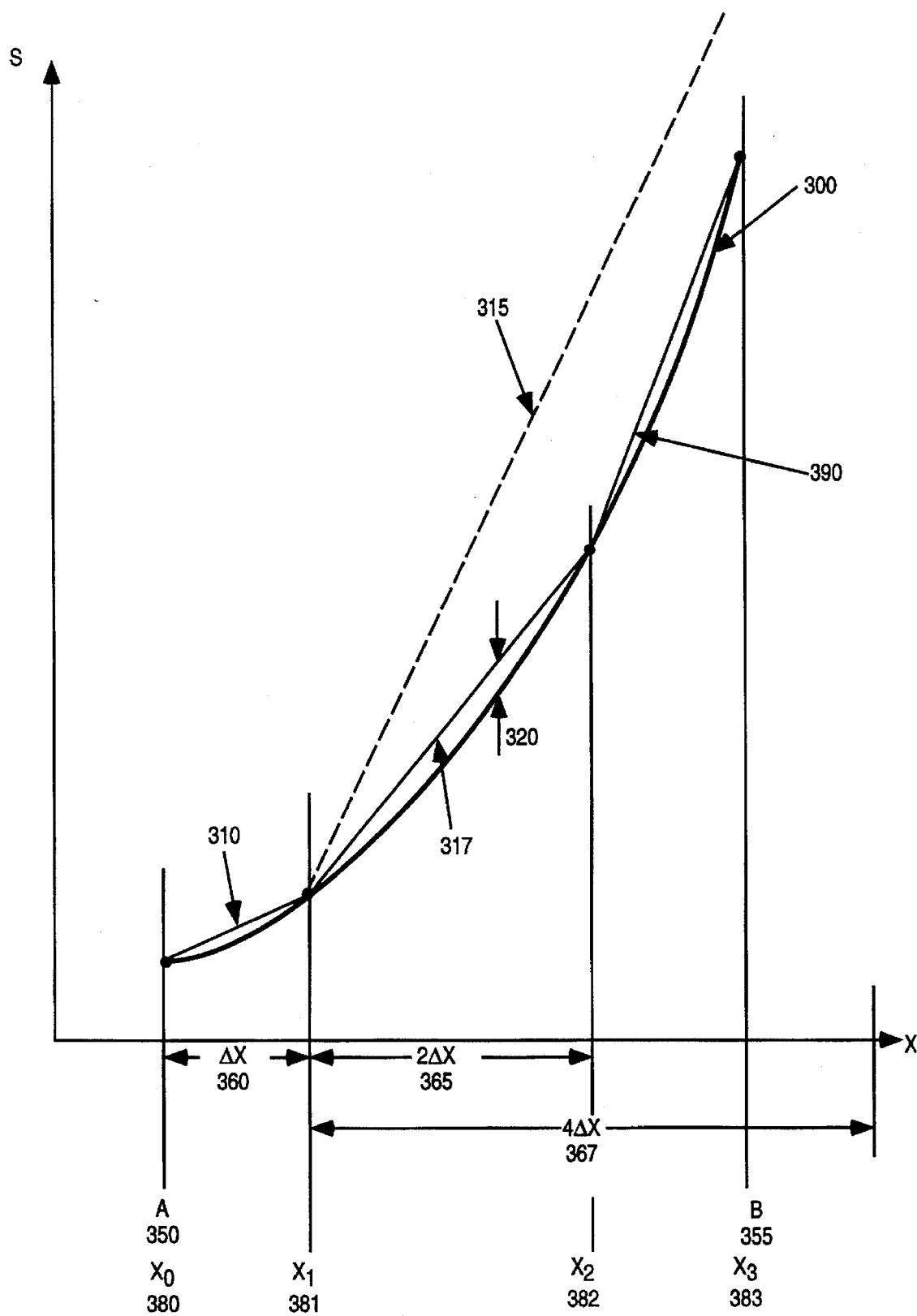
FIG. 3 illustrates a relationship between a texture map and a portion of a model.

FIG. 3 illustrates a relationship between a texture map and a portion of a model.

One method of performing texture mapping is by point sampling. Point sampling determines a texel for each pixel center within a polygon. A commonly accepted method of determining a texel is by evaluating a function S(x) exactly. S(x), as described below, defines the relationship between a point on a polygon and a location in the texture map. Therefore, for commonly accepted point sampling, assume that each scanline of a polygon is rendered one pixel at a time. Further, assume that each pixel's center can be identified by a particular x position on a scan line. Determining a value of a pixel's center is equivalent to determining the entire pixel's value. Therefore, the relationship between a pixel center 240 and a position in texture map 220 can be determined by evaluating a function S(x):

$$S(x) = \frac{ax+b}{cx+d}$$

$$S(x) = \frac{s(x)}{q(x)}$$

$$S(x) = \frac{s_0(B-x) + s_1(x-A)}{q_0(B-x) + q_1(x-A)}$$

where $$s(x) = s_0 \frac{B-x}{B-A} + s_1 \frac{x-A}{B-A} = ax+b$$

$$q(x) = q_0 \frac{B-x}{B-A} + q_1 \frac{x-A}{B-A} = cx+d$$

FIG. 3 illustrates a relationship S(x). The exact S(x) 300 illustrates the exact relationship between any x location in the example display 221 and any location in texture map 220. A 350 identifies one end of exact S(x) 300. B 355 identifies the other end of exact S(x) 300.

Points on exact S(x) 300 locations are precise locations; they are not restricted to pixel centers or individual texels. For example, a pixel on a scanline can be identified by a number x=6. A single corresponding texel can then be located in the texture map 220 at an (x, y) position, e.g. (2,5). However, exact S(x) 300 can accept x positions such as x=1.25694, and return texture map 220 locations such as (7.15323, 8.29834).

We have determined that generating an exact value for S(x) 300 is more accurate than necessary, relative to other aspects of generating an image. Further, determining an exact value for S(x) 300 can be computationally expensive (simplified, it contains two additions and one division). A maximum amount of error between an exact value of S(x) 300 and an approximation of S(x) 300 is referred to as $\epsilon$. In one embodiment of the present invention, $\epsilon$ equals ½ the distance between two texel locations.

We have discovered that by evaluating approximations of S(x) 300 at equally spaced values of x, we can improve the performance of the mapping process. Further efficiency can be achieved by accessing only one texel for each pixel center in a polygon.

Linear Approximation

One possible method of determining an approximation of S(x) 300 is to generate a single linear approximation. The linear approximation function, L(x), determines the texture map 220 locations. The problem with a single linear approximation is that it is difficult to stay within $\epsilon$ for some relationships of S(x).

The bound on the error between S(x) and L(x) over the interval [A,B] is given by Filip [FMM86, Bur93], where R(A,B) is the maximum magnitude of the second derivative over [A . . . B].

$$\sup_{A \leq x \leq B} \|L(x) - S(x)\| \leq (1/8)(B-A)^2 R(A,B)$$

The second derivative of S(x) is given by:

$$\frac{d^2}{dx^2} S(x) = \frac{-2(q_1 - q_0)(s_1 q_0 - s_0 q_1)}{(B-A)^2 q(x)^3}$$

The maximum magnitude of the error is reached when the denominator is minimized. The denominator is the cube of the monotonic function q(x). Without loss of generality, assume q(x) is positive. Therefore, $$R(x_{left}, x_{right}) = \left\| \frac{-2(q_1 q_0)(s_1 q_0 - s_0 q_1)}{(B-A)^2 (\min(q(x_{left}), q(x_{right})))^3} \right\| \quad \text{(Equation 1)}$$

Again, assume that $\epsilon$ is the upper bound on texture coordinate location error. If R(A,B) is at most $\epsilon$, then we may approximate S(x) by a single linear segment. Otherwise, we approximate S(x) by a piecewise linear curve as described below.

Piecewise Linear Approximation

Another method of determining an approximation of S(x) 300 is to use a piecewise linear function P(x). For example, FIG. 3 includes P(x) 390 which has three segments. The error 320 represents the approximation error between a value on P(x) 390 and a value on exact S(x) 300. To ensure an acceptable image quality, the error 320 must be less than $\epsilon$ over all P(x) 390.

One method of performing a piecewise linear approximation is to divide the range of A 350 and B 355 in two, and then divide those in two, etc. When an appropriate value of the error is achieve for each line segment, then enough divisions have occurred. However, this method can require an unacceptable number of operations.

For one embodiment of the present invention, we observed that the derivative of S(x) becomes smaller as the value of x either becomes larger or becomes smaller. That is, exact S(x) 300 becomes straighter in one direction along the x axis. In FIG. 3, exact S(x) 300 becomes straighter in a direction from A to B.

Generally, after determining texel values using one line segment, e.g. present segment 310, we first determine whether $\epsilon$ is exceeded by doubling the step size used for the present segment 310, e.g. doubling $\Delta x$ (step size) 360. If $\epsilon$ is not exceeded for the line segment corresponding to 2$\Delta x$ (double the step size) 365, then we double the step size again, e.g. 4$\Delta x$ (four times the step size) 367, and repeat the test. Line segment for four times the step size 315 corresponds to a line segment that would be created using four times the step size (not taking into account that four times the step size exceeds B 355). Eventually, $\epsilon$ will be exceeded, at which point the last step size that had a maximum error less than, or equal to, $\epsilon$ is used. Doubling the step size also stops when the last value of S(x) is reached, e.g. B 355.

If we determine in which direction S(x) becomes straighter, we can start at the opposite end of S(x). Therefore, we know that when determining the next segment 317, the $\Delta x$ step size 360 of the present segment 310 will always satisfy $\Delta$. If $\Delta$ is exceeded by the first doubling of the step size 360 (e.g. 2$\Delta x$ double the step size 365), then the $\Delta x$ step size 360 can be used without further operations.

Note that this approach has a number of advantages. Each doubling requires only an error determination and a single comparison. Further, doubling the step size is a computationally inexpensive operation (e.g. a shift operation). Note that doubling the step size means increasing the line segment length. Of course, other ways of increasing the line segment length are possible. For example, step sizes can be increased by a fixed amount, or by doubling or quadrupling the present line segment length. However, doubling is an efficient method of lengthening the next line segment.

The following provides a more detailed description of the above described method. Let $A=X_0, X_1, X_2, \ldots, X_n=B$ be the breakpoints of $P(x)$, where $X_0=A$ and $X_n=B$. For example, $X_0 380$, $X_1 381$, $X_2 382$ and $X_3 383$ are the breakpoints the $P(x)$ 390. We define $P(x)$ as follows.

$$P(x) = P_i(x), \text{ where}$$

$$X_i \leq x \leq X_{i+1}$$

$$P_i(x) = \left( \frac{s(X_i)}{q(X_i)} \right) \frac{X_{i+1} - x}{X_{i+1} - X_i} + \left( \frac{s(X_{i+1})}{q(X_{i+1})} \right) \frac{x - X_i}{X_{i+1} - X_i}.$$

$P_i$ is the linear function approximating: $s(X)$ at $X_i$ and $X_{i+1}$. And since $P_i(X_{i+1})=P_{i+1}(X_i)$, $P(x)$ is continuous.

We shall find the breakpoints of $P(x)$ iteratively, starting from the end of $S(x)$ whose second derivative is highest. Without loss of generality, assume that the magnitude of the second derivative of S is maximized at $x_{left}$. Then, $$R(x_{left}, x_{middle}) = R(x_{left}, x_{right})$$

This observation provides the impetus for our process. We choose $x_{middle}$ such 3that the length $|x_{middle}-x_{left}|$ is maximized subject to the constraint that $(\frac{1}{8})(x_{middle}-x_{left})^2 R(x_{left}, x_{right})$ is less than $\epsilon$ (e.g. one-half a texel). Thus, $$x_{middle} = x_{left} + \min(x_{right} - x_{left}, \sqrt{8\epsilon/R(x_{left}, x_{right})}).$$

We repeat this step on the curve segment $[x_{middle}, x_{right}]$ until $x_{middle}=x_{right}$. This end-chopping like method produces a piecewise linear curve that satisfies $\epsilon$, but is yet not as efficient as possible. At each breakpoint on $P(x)$, we determine $R(x_{middle}, x_{right})$. However, we have observed that Equation 1 reveals a simple relationship between $R(x_{middle}, x_{right})$ and $R(x_{left}, x_{right})$, $$\frac{R(x_{left}, x_{right})}{R(x_{middle}, x_{right})} = \left( \frac{q(x_{middle})}{q(x_{left})} \right)^3$$

The denominator of this ratio is independent of the new breakpoint $x_{middle}$. Therefore, we only need compute $1/q(x_{left})$ once for $S(x)$. However, in one embodiment of the present invention, this requires that a 3/2 root of $q(x)$ be determined for each line segment.

We overcome this deficiency by inverting the segmenting process. Instead of computing the length of the longest conforming line segment from a given point on $S(x)$, we determine if $S(x)$ may be locally approximated by a line segment corresponding to a step size of $2\Delta x$ 365. If so, we double step size $\Delta x$ 360 and test the curve again. In one embodiment, $\Delta x$ 360 is an integer. This makes doubling $\Delta x$ 360 simply a shift operation.

We test the curve by comparing the value of q at the end of the curve whose second derivative varies fastest (i.e. the lower value of q) to the value $q_{min}(2\Delta x)$, where $q_{min}(\Delta x)$ $$q_{min}(\Delta x) = \sqrt[3]{((\Delta x)^2/(4\epsilon))(B-A)^2|(q_1 - q_0)(s_1 q_0 - s_0 q_1)|} \quad \text{(Equation 2)}$$

$q_{min}$ is a complex function. However, we are only interested in a small discrete set of values of $q_{min}$, namely $q_{min}(2^1), q_{min}(2^2), \ldots, q_{min}(2^m)$, where $m=[\log(B-A)]$. We may express $q_{min}(2^i)$ in the form, where $$qmin(2^i) = Cu_{min}(i),$$

where $$u_{min}(i) = \sqrt[3]{(2)^{2i}/(4\epsilon)}$$

$$C = \sqrt[3]{(B-A)^2|(q_1 - q_0)(s_1 q_0 - s_0 q_1)|}.$$

We may pre-compute (e.g. at compile time) the values of $u_{min}(i)$ for $i \in [1, m]$. And we may compute C once for the entire curve.

Rendering an Image

Figure 4:
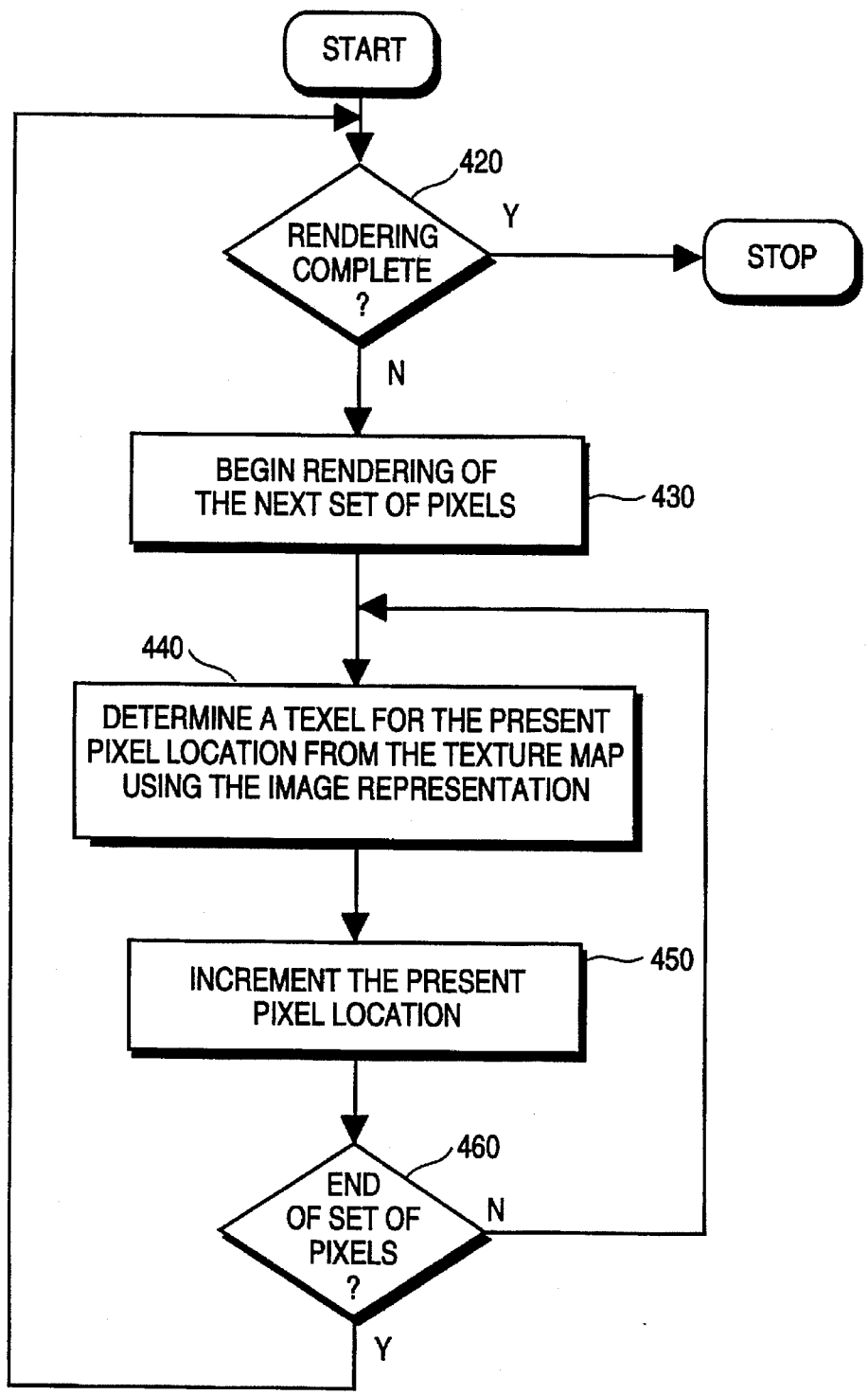
FIG. 4 is a flowchart of the steps used to render an image.

FIG. 4 is a flowchart of the general steps used to render an image using texture mapping. In particular, texels are determined for each line of pixel centers for a given polygon. These steps can be executed on the computer system 100. Typically, processor 109 executes instructions to render an image from a computer model and texture map stored in memory 104.

At step 420, a test is made to determine whether the rendering process has been completed (e.g. have all the polygons in the 3-D computer model been rendered for all the lines of pixels in the example display 221). If the process is not complete, then step 430 is executed. At step 430, a rendering of the next set of pixels is started. The set of pixels to be rendered are all related by the relationship $S(x)$. This can be, for example, all the pixels on a single polygon or all the pixels in a straight line for a polygon. In one embodiment, step 430 starts the process of determining each pixel value for each pixel in a line of pixels by accessing the appropriate polygon from main memory 104.

At step 440, the texel for the present pixel location (in the present line being rendered) is determined from the texture map using the image representation. At step 450, the present pixel location is incremented. At step 460, a test is made to determine whether the present set of pixels has been completely rendered. Steps 440–460 are repeated until the present set of pixels have been completely rendered. If the present set of pixels has been completely rendered, then the test of step 420 is re-executed.

Therefore, by executing steps 420–460, a computer model and texture map can be combined to render an image.

Rendering an Image using Piecewise Linear Approximation

Figure 5:
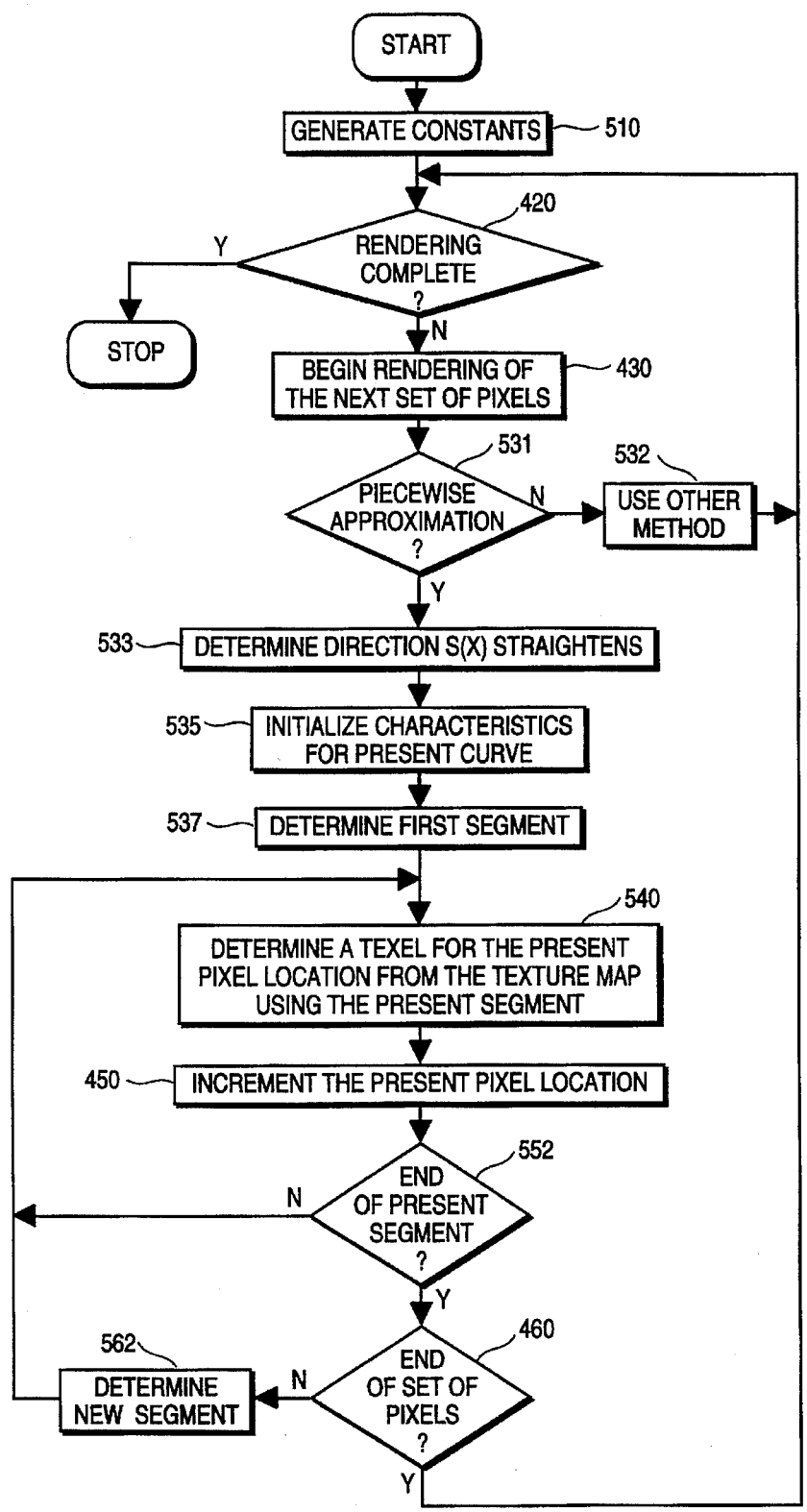
FIG. 5 is a more detailed view of FIG. 4 flowchart where an image is rendered using line segment approximations of a relationship between a texture map and a portion of a model.

FIG. 5 is a flowchart of steps that may be followed to render an image using a piecewise linear approximation.

At step 510, constants that can be determined prior to execution of the program are determined. In one embodiment, the values of umin(i) can be precomputed at compile time. This removes the need to compute these values for each $P(x)$.

Next are step 420 and step 430 (as in FIG. 4).

At step 531, a test is made on $S(x)$ to determine whether it would be more efficient to use piecewise linear approximation, linear approximation, direct evaluation of $S(x)$, or some other method of determining pixels. If piecewise linear approximation is not the most efficient method of rendering a portion of the image, then step 532 is executed to use a more efficient method. For example, if S(x) is sufficiently straight, then simple linear approximation may be used. If the distance between B and A is short (i.e. few pixels will be determined for the given S(x)), then direct evaluation of S(x) may be more efficient.

If piecewise linear approximation is to be used, then at step 533, it is determined at which end does S(x) straighten. This can be done in a number of ways; for example, the second derivative of S(x) can be determined at each end. The end having the smallest second derivative will be the straighter end. Therefore, in this embodiment, we start determining pixels from the other end of S(x).

Next, at step 535, characteristics for the present curve, S(x), are determined. These characteristics can include values of C.

At step 537, the first segment is determined. This first segment is the first present segment used in the following steps.

At step 540, a texel is accessed from the texture map using the present pixel location (corresponding to an x value) and the present segment. For example, if the present pixel location is x=883, then P(x) is evaluated to determine a location in the texture map.

Next, at step 450, the present pixel location is incremented. Using the last example, after step 450, the present pixel location would be x=884.

At step 552, a test is made to determine whether the end of the present segment has been reached. Step 540, step 450, and step 552 are repeated until the end of the present segment has been reached.

At step 460, the end of the present set of pixels is tested. In one embodiment, the test is made by determining whether the last pixel value for S(x) has been determined. This pixel would be identified by one of the endpoints of S(x), either A or B. If the end of the present set of pixels has not been reached, then, at step 562, a new present segment is determined, and then step 540 onward is repeated.

Determining Line Segments

Figure 6:
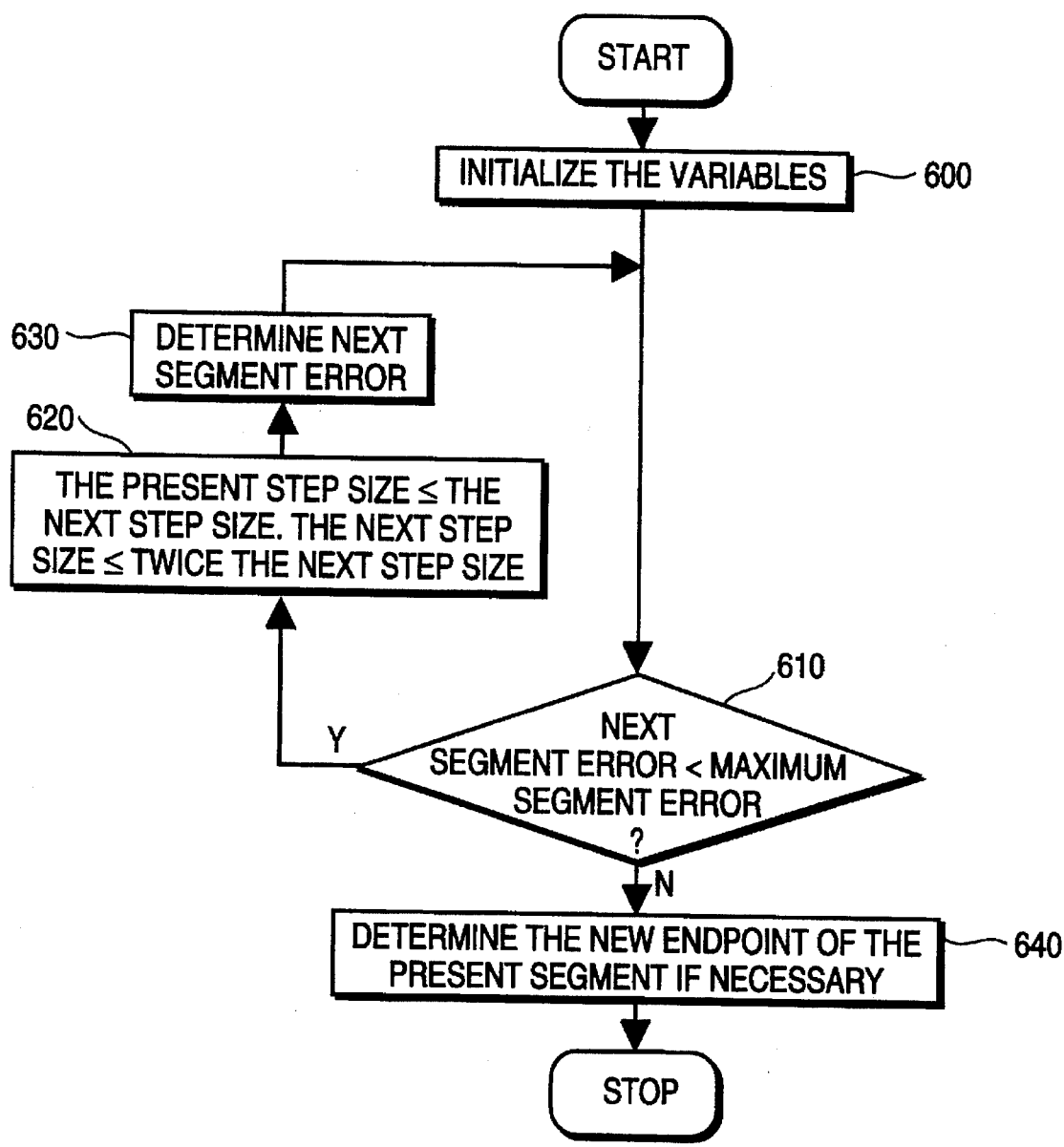
FIG. 6 is a flowchart illustrating a process of determining a line segment.

FIG. 6 is a flowchart of the steps executed to determine a new present segment (step 562). For initialization, assume that the next segment equals twice the present segment.

At step 600, variables are initialized. For example, the present step size may be set to 1, and the corresponding error can be determined.

At step 610, a test is performed to determine whether the error associated with the next step size is greater than the maximum segment error ($\epsilon$). This can be accomplished by comparing the value of q at the end of the curve whose second derivative varies fastest, the end having the lower value of q, to the value $q_{min}(2\Delta x)$. See the discussion above for more information. If the maximum segment error is not exceeded, then at step 620, the present step size is set to the next step size and the next step size is doubled. At step 630, the maximum error of the next segment is determined using the doubled step size. Then step 610 onward is repeated.

If, at step 610, the error associated with the next step size is greater than $\epsilon$, then at step 640, the endpoint of the present segment is determined. Thus, the present segment of step 640 is the final result of step 562.

EXAMPLE SOURCE CODE

Table 1 includes example C language source code used in one embodiment of the present invention. For sufficiently long curves of S(x), the above described method and apparatus outperforms previous methods. However, as mentioned above, for a relatively flat S(x), or for a short S(x), one embodiment of the present invention uses linear approximation or direct evaluation of S(x), respectively. Therefore, in one embodiment, before we compute C we test for linearity, or shortness, as illustrated in Table 2.

TABLE 1

```
© 1995 Silicon Graphics Incorporated
 1. void TextureMapDoublingSegments(
 2. float s0, float s1,
 3. float q0, float q1,
 4. int A, int B )
 5. {
 6.   assert( q0<=q1 );
 7.   assert( A < B );
 8.   int xlen = B - A;
 9.   float qdiff = q1 - q0;
10.   float xlenInv = 1.0f / xlen;
11.   float ds = (s1 - s0) * xlenInv;
12.   float dq = qdiff * xlenInv;
13.   float S = s0 / q0;
14.   float num = fabs( qdiff * (s1*q0 - s0*q1) * xlenInv * xlenInv);
15.   float unScaledQmin = powf( num, 1.0/3.0 );
16.   int deltaX = 1;
17.   float deltaS = ds;
18.   float deltaQ = dq;
19.   float deltaXinv = 1.0f;
20.   float *powerTableP = powerTableEps;
21.   float qmin = unScaledQmin * *(powerTableP++)
22.   while( 1 ) {
23.     while( q0 > qmin) {
24.       deltaX <<= 1;
25.       deltaXinv *= 0.5f;
26.       deltaS *= 2.0f;
27.       deltaQ *= 2.0f;
28.       if( (A + deltaX) >= B ) break;
29.       qmin = unScaledQmin * *(powerTableP++);
30.     }
```

TABLE 1-continued

```
31.   const int xmid = A + deltaX;
32.   const float smid = s0 + deltaS;
33.   const float qmin = q0 + deltaQ;
34.   const float Smid = smid / qmid;
35.   const float dS = (Smid - S) * deltaXinv;
36.   if( xmid >= B ) {
37.      while( A != B ) {
38.         texel( A++, S );
39.         S += dS;
40.      }
41.      break;
42.   }
43.   while( A != xmid ) {
44.      texel( A++, S );
45.      S += dS;
46.   }
47.   S = Smid;//can be eliminated, but incur more round-off error
48.   s0 = smid; q0 = qmid;
49. }
59. }
```

TABLE 2

```
© 1995 Silicon Graphics Incorporated
1  if( qdiff == 0.0f ) {
2     /* curve is linear */
3     Segment( s0, s1, q0, q1, A, B );
4     float S1 = s1 / q1;
5     float dS = (S1 - S) * xlenInv;
6     while( A != B ) {
7        texel( A++, S );
8        S += dS;
9     }
10    return
11 }
12
13 if( xlen < MINSPAN ) {
14    /* short curve */
15    while( A != B ) {
16       texel( A++, s0 / q0 );
17       s0 += ds;
18       q0 +=dq;
19    }
20    return;
21 }
```

An efficient method and apparatus for determining texture coordinates for lines and polygons has been described.

What is claimed is:

1. A method of generating a pixel in a computer system, said computer system including a processor and a memory, said memory including a first polygon and a texture map, said method comprising the steps of:

accessing a first point on said first polygon;

determining a first line segment within a predetermined error of a known relationship between pixels of said polygon and location of said texture map; and determining whether a next line segment causes less than said predetermined error, said next line segment being longer than said first line segment in one direction;

if said next line segment causes less than said predetermined error, then determining whether a new next line segment causes less than said predetermined error, and otherwise, accessing a texel in said texture map at a location corresponding to said first point and said first line segment, and generating said pixel from said texel.

2. The method of claim 1 wherein said step of determining whether said next line segment causes less than said predetermined error comprises the following steps:

accessing a second step size corresponding to said next line segment;

determining a maximum error associated with said second step size;

comparing said maximum error with said predetermined error.

3. The method of claim 2 said first line segment corresponds to a first step size and wherein said second step size is twice said first step size.

4. A method of rendering an image having a plurality of pixel values in a computer system, said computer system including a processor and a memory, said processor being coupled to said memory, said memory including a texture map and a polygon, said method including the steps of:

determining a first pixel value corresponding to a texel in said texture map;

generating line segments that approximate a known relationship between pixels of a display and locations of said texture map, each subsequent line segment of said line segments being at least as long in one axis as a previous line segment;

for each line segment, determining at least a first pixel from said texture map and a corresponding line segment; and storing each pixel in said memory.

5. The method of claim 4 wherein said step of determining at least a first pixel includes accessing said texture map at a location determined by a point in a corresponding line segment.

6. The method of claim 5 wherein a texel closest to said location is used to generate a corresponding pixel.

7. The method of claim 5 wherein a plurality of texels near said location are interpolated and a result is used to generate a corresponding pixel.

8. A computer system for displaying a rendered image, said computer system comprising:

a memory having stored therein a texture map and a polygon;

a processor coupled in communications with said memory, said processor determining a relationship between said polygon and said texture map, said processor further determining a plurality of line segments approximating said relationship, each line segment being at least as long in one axis as a previous line segment, said processor configured to determine pixels from said line segments, said processor further configured to store said pixels in said memory;

a display, coupled in communications with said memory, said display configured to display signals corresponding to said pixels.

9. The computer system of claim 8 wherein one of said line segments is twice as long in one direction as a previous line segment.

10. A method of determining texture coordinates in a computer system using an approximation of a known relationship between locations on a display and locations in a texture map, said computer system including a processor and a memory, said memory having stored therein said texture map, said method comprising the steps of:

a) approximating a portion of said known relationship with an approximated line segment by
        i) determining a first line segment that is within a predetermined error of said portion of said known relationship,
        ii) evaluating a second line segment, said second line segment longer than said first line segment along at least one axis, and
        iii) if said second line segment is determined to be within said predetermined error, then selecting said second line segment as said approximated line segment for said portion, otherwise selecting said first line segment as said approximated line segment for said portion;

b) repeating step (a) for each portion of said known relationship until said approximation of said known relationship is complete; and c) generating one or more pixels by accessing one or more texels in said texture map based upon said approximation.

11. The method of claim 10 wherein said step of determining a first line segment further includes the step of accessing a first step size, the length of said first line segment, along at least one axis, limited to said first step size.

12. The method of claim 10 wherein said step of evaluating a second line segment further comprises the steps of:

accessing a second step size, the length of said second line segment, along at least one axis, limited to said second step size; and determining if a maximum error associated with said second line segment is within said predetermined error.

13. The method of claim 12 wherein said step of accessing a second step size includes the step of determining said second step size based upon said first step size.

14. The method of claim 13 wherein said second step size is two times said first step size.

* * * * *